United States Patent
Kasahara

(10) Patent No.: US 6,783,178 B2
(45) Date of Patent: Aug. 31, 2004

(54) ELECTRIC SEAT

(75) Inventor: Taro Kasahara, Omori-nishi (JP)

(73) Assignee: Mineba Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/078,461

(22) Filed: Feb. 21, 2002

(65) Prior Publication Data

US 2002/0113478 A1 Aug. 22, 2002

(30) Foreign Application Priority Data

Feb. 22, 2001 (JP) ........................................ 2001-046578

(51) Int. Cl.⁷ .............................................. A47C 1/02
(52) U.S. Cl. ..................................... 297/330; 297/217.3
(58) Field of Search ........................... 297/362.11, 330, 297/217.3, 284.4, 284.6; 5/424, 616, 617

(56) References Cited

U.S. PATENT DOCUMENTS

| | | | | |
|---|---|---|---|---|
| 4,669,780 A | * | 6/1987 | Sakakibara et al. .......... | 297/257 |
| 4,998,939 A | * | 3/1991 | Potthast et al. ................. | 5/424 |
| 5,127,708 A | * | 7/1992 | Kishi et al. .............. | 297/284.1 |
| 5,129,704 A | * | 7/1992 | Kishi et al. .............. | 297/284.1 |
| 5,230,113 A | * | 7/1993 | Foster et al. .................... | 5/608 |
| 5,235,258 A | * | 8/1993 | Schuerch ..................... | 318/16 |
| 5,320,409 A | * | 6/1994 | Katoh et al. .............. | 297/284.6 |
| 5,613,252 A | * | 3/1997 | Yu et al. ........................ | 5/88.1 |
| 5,931,532 A | * | 8/1999 | Kemmerer et al. .......... | 297/330 |
| 5,983,425 A | * | 11/1999 | DiMucci et al. ................ | 5/611 |
| 6,000,076 A | * | 12/1999 | Webster et al. ................. | 5/618 |
| 6,095,610 A | * | 8/2000 | Okajima et al. ........ | 297/423.36 |
| 6,439,636 B1 | * | 8/2002 | Kuo .......................... | 296/65.09 |

* cited by examiner

*Primary Examiner*—Peter M. Cuomo
*Assistant Examiner*—Stephen D'Adamo
(74) *Attorney, Agent, or Firm*—Oliff & Berridge, PLC

(57) ABSTRACT

An electric seat in which other members are prevented from being damaged and thus safety is ensured.

When a current consumed by the leg rest motor during the downward pivotal movement of the leg rest is larger than the reference value for the downward movement of the leg rest, the switch for the motor is opened. In a case where the leg rest is pivoted downward with a baggage placed in the operating space of the leg rest in the bed position, when the leg rest abuts against the baggage, a large load is applied to the leg rest and a current that exceeds the reference value for the downward movement of the leg rest flows in the leg rest motor, the switch is opened, the respective motors are actuated, and the downward pivotal movement of the leg rest is stopped. Therefore, the leg rest is prevented from pressing the baggage unnecessarily, thereby preventing the baggage from being damaged.

4 Claims, 3 Drawing Sheets

ELECTRIC SEAT

BACKGROUND OF THE INVENTION

1. Field of the Invention

The present invention relates to an electric seat to be installed in places such as the first-class cabin of the aircraft.

2. Description of the Related Art

One example of the conventional seat to be installed in the first-class cabin of the aircraft comprises a seat cushion mounted on the frame supported on the floor so as to move in the fore-and-aft direction, a seatback supported on the rear side of the seat cushion for pivotal movement, a leg rest supported on the front side of the seat cushion for pivotal movement, and a footrest provided in the storage formed in the leg rest so as to appear and disappear (move forward and backward).

The position of such an electric seat can be changed among the normal position in which the seatback is in the near upright position and the leg rest having the footrest stored therein faces downward to the near vertical position, the reclined position in which the seatback is inclined backward (downward), and the leg rest having the footrest stored is inclined forward (upward), and the bed position where the seatback is in the near horizontal position and the leg rest with the footrest pulled out is held in a horizontal position on the level with the footrest. The seat is adapted to be changed in its position by operating the corresponding position-change switches provided on the operating panel. The position is changed in the order of the normal position→the reclined position→the bed position, and in reverse, in the order of the bed position→the reclined position→the normal position.

Incidentally, in the electric seat described above, many members such as a seatback, leg rest, and the footrest are operated, and there may be cases where these members come in contact with a person or an object when operated. For example, when the member (the seatback, the leg rest or the footrest) is operated with, for example, a person or an object placed in the operating range of the seatback, leg rest, or the footrest, a driving force of the driving means such as an electric motor for driving these members is applied to the person or the object, and may press or jam the same, which may result in lowering of safety or damage of the object.

SUMMARY OF THE INVENTION

In light of the above, an object of the present invention is to provide an electric seat in which damage of other member may be prevented so as to ensure safety.

The present invention is an electric seat comprising a seatback and a leg rest supported by a seat cushion for pivotal movement, a footrest supported for forward and backward movement with respect to the leg rest, electric motors provided for the seatback, the leg rest, and the footrest respectively for driving the same, operating direction detecting means for detecting the operating direction of at least one of the seatback the leg rest, and the footrest, consumed current detecting means for detecting a current consumed by the operation of at least one of the seatback, the leg rest, and the footrest, and determining means for comparing the operating direction detected by the operating direction detecting means with the predetermined operating direction, comparing the consumed current detected by consumed current detecting means with the predetermined reference value, and executing determination of the operating condition based on the compared results by determining whether or not an unnecessary reaction force is acting on at least one of the seatback, the leg rest, and the footrest.

Preferably, an electric seat of the present invention comprises operation-stopping means for bringing the operation of at least one of the seatback, the leg rest, and the footrest to a stop in case the determining means determines that an unnecessary reaction force is acting as the result of the determination of the operating condition by the determining means.

Preferably, an electric seat of the present invention further comprises an alarm means for generating an alarm in case an unnecessary reaction force is acting as the result of the determination of the operating condition by the determining means.

DESCRIPTION OF THE PREFERRED EMBODIMENTS

An electric seat according to an embodiment of the present invention will be described with reference to FIG. 1 to FIG. 4. The electric seat 1 is to be installed in the first-class cabin of the aircraft.

Figure 1:
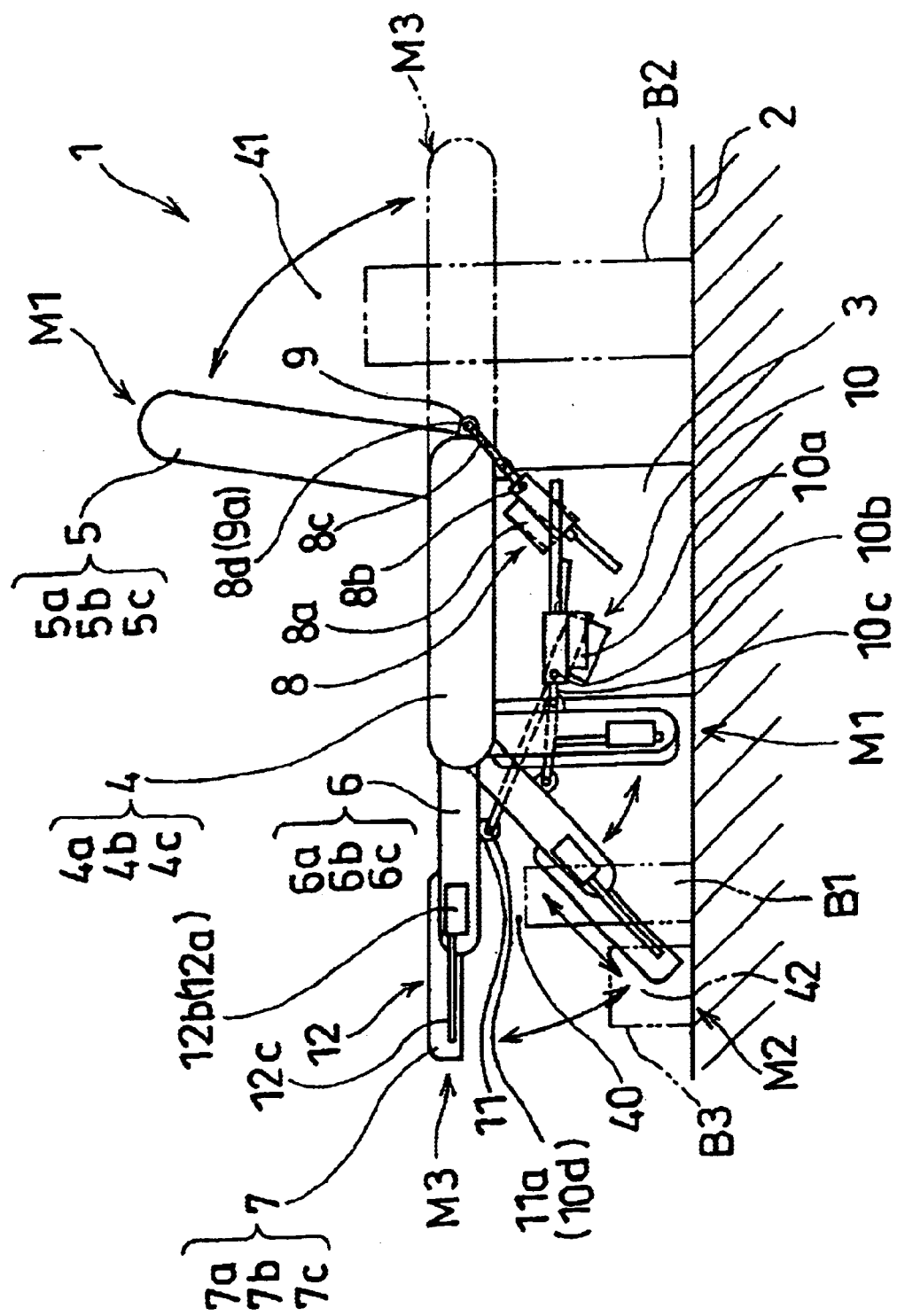
FIG. 1 is an exploded perspective view showing an electric seat according to an embodiment of the present invention.
Figure 2:
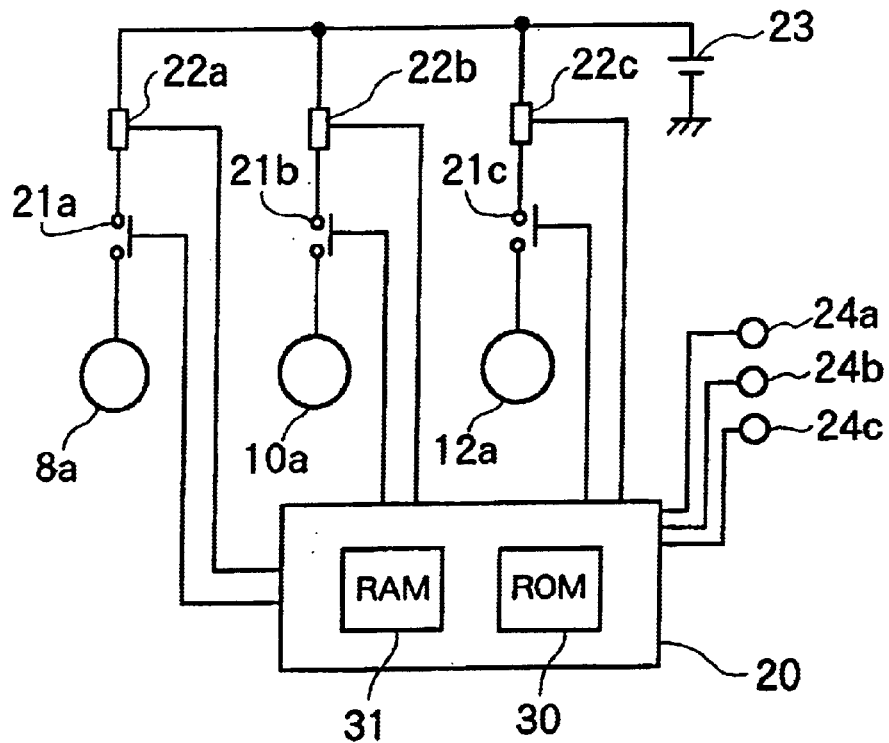
FIG. 2 is a block diagram showing a controller to be used for the electric seat shown in FIG. 1.

The electric seat 1 generally comprises, as shown in FIG. 1 and FIG. 2, a main frame 3 to be mounted on the floor 2 of the first-class cabin of the aircraft, a seat cushion 4 supported by the main frame 3 so as to be movable in the fore-and-aft direction, a seatback 5 supported on the rear side of the seat cushion 4 for pivotal movement, a leg rest 6 supported on the front side of the seat cushion 4 for pivotal movement, and a footrest 7 supported by the leg rest 6 so as to move forward and backward in the direction along the leg rest 6, wherein the position can be changed among the normal position M1, the reclined position M2, and the bed position M3 when in use.

The range of pivotal movement of the seatback 5 ranges from the near upright position to the near horizontal position. The range of pivotal movement of the leg rest 6 ranges from the near horizontal position to the near vertical position in which the front edge of the leg rest 6 faces downward. The footrest 7 is shorter than the leg rest 6, and is adapted to be in close agreement with the front edge portion of the leg rest 6 when it is retracted into the leg rest 6 to the maximum extent as shown in the near vertical position in FIG. 1.

The seat cushion 4 generally comprises a seat cushion frame 4a supported by the main frame 3 so as to move in the fore-and-aft direction, a seat cushion body 4b held by the seat cushion frame 4a and having resiliency, and a seat cushion cover 4c for covering the seat cushion body 4b and the seat cushion frame 4a.

The seatback 5 generally comprises a seatback frame 5a supported by the seat cushion frame 4a for pivotal movement, a seatback cushion portion 5b held by the seatback frame 5a and having resiliency, and a seatback cover 5c for covering the seatback cushion portion 5b and the seatback frame 5a.

The leg rest 6 generally comprises a leg rest frame 6a supported by the seat cushion frame 4a for pivotal movement, a leg rest cushion portion 6b held by the leg rest frame 6a and having resiliency, and a leg rest cover 6c for covering the leg rest cushion portion 6b and the leg rest frame 6a.

The footrest 7 generally comprises a footrest frame 7a supported by the leg rest frame 6a so as to move in the fore-and-aft direction, a footrest cushion portion 7b held by the footrest frame 7a and having resiliency, and a footrest cover 7c for covering the footrest cushion portion 7b and the footrest frame 7a.

A seatback driving mechanism 8 is interposed between the main frame 3 and the seatback frame 5a. The seatback driving mechanism 8 comprises a seatback motor 8a constructed of a DC brushless motor, and a seatback power transmission mechanism 8b such as a ball screw actuated by the seatback motor 8a, so that the rotational output of the seatback motor 8a is transmitted to the movable shaft 8c of the seatback power transmission mechanism 8b for rectilinear movement.

The seatback motor 8a and the seatback power transmission mechanism 8b are jointed and held by the main frame 3 for pivotal movement.

There is provided a shaft 8d on the tip of the movable shaft 8c of the seatback power transmission mechanism 8b, and the shaft 8d is rotatably inserted into the hole 9a on the bracket 9 provided on the seatback frame 5a. When the movable shaft 8c of the seatback power transmission mechanism 8b is moved toward the rear of the seat, the seatback 5 is inclined upward, and when the movable shaft 8c is moved toward the front of the seat, the seatback 5 is inclined downward.

There is provided a position maintaining mechanism between the main frame 3 or the seat cushion frame 4a and the seatback 5, so that the seatback 5 is supported in a state in which the seatback 5 is inclined to the near horizontal position. The position maintaining mechanism may be provided on the seatback power transmission mechanism 8b.

A leg rest driving mechanism 10 is interposed between the main frame 3 and the leg rest frame 6a. The leg rest driving mechanism 10 comprises a leg rest motor 10a constructed of a DC brushless motor, and a leg rest power transmission mechanism 10b such as a ball screw driven by the leg rest motor 10a, so that the rotational output of the leg rest motor 10a is transmitted to the movable shaft 10c of the leg rest power transmission mechanism 10b for rectilinear movement.

The leg rest motor 10a and the leg rest power transmission mechanism 10b are connected and held by the main frame 3 for pivotal movement.

There is provided a shaft 10d on the tip of the movable shaft 10c of the leg rest power transmission mechanism 10b, and the shaft 10d is rotatably inserted in the hole 11a on the bracket 11 provided on the leg rest frame 6a. When the movable shaft 10c of the leg rest power transmission mechanism 10b is moved toward the front of the seat, the leg rest 6 is inclined upward, and when the movable shaft 10c is moved toward the rear of the seat, the leg rest 6 is inclined downward. In this case, the seat cushion 4 is adapted to move forward and backward with the inclining movement of the leg rest 6 by the movement of the movable shaft 10c of the leg rest power transmission mechanism 10b, and the leg rest driving mechanism 10 works also as the seat cushion driving mechanism 4.

There is provided a position maintaining mechanism between the main frame 3 and the leg rest 6, so that the leg rest 6 is supported in a state in which the leg rest 6 is inclined to the near horizontal position. The position maintaining mechanism may be provided on the leg rest power transmission mechanism 10b.

A footrest driving mechanism 12 is interposed between the leg rest frame 6a and the footrest frame 7a. The footrest driving mechanism 12 comprises a footrest motor 12a constructed of a DC brushless motor and a footrest power transmission mechanism 12b such as a ball screw driven by the footrest motor 12a, so that the rotational output of the footrest motor 12a is transmitted to the movable shaft 12c of the footrest power transmission mechanism 12b for rectilinear movement.

A footrest frame 7a is connected to the tip of the movable shaft 12c of the footrest power transmission mechanism 12b, so that the footrest 7 moves forward and backward with the rectilinear movement of the movable shaft 12c. It is also possible to construct the footrest driving mechanism 12 of the linear motor instead of the footrest motor 12a of the rotary type and the footrest power transmission mechanism 12b, so that the footrest 7 is moved forward and backward by the linear motor.

The direction of rotation of the respective motors (the seatback motor 8a, the leg rest motor 10a, and the footrest motor 12a) may be changed by controlling the controller 20, so that the direction of the movement of the movable shafts (8c, 10c, 12c) of the respective driving mechanism (the seatback driving mechanism 8, the leg rest driving mechanism 10, and the footrest driving mechanism 12) are changed.

The seatback motor 8a is connected via the switch that is controlled by the controller 20 (the seatback switch 21a) and the current detector such as CT (the seatback current detector 22a) [the consumed current detecting means] to the power supply 23 so as to be supplied with an electric current.

The leg rest motor 10a is connected via the switch that is controlled by the controller 20 (the leg rest switch 21b) and the current detector such as CT (the leg rest current detector 22b) [the consumed current detecting means] to the power supply 23 so as to be supplied with an electric current.

The footrest motor 12a is connected via the switch that is controlled by the controller 20 (the footrest switch 21c) and the current detector such as CT (the footrest current detector 22c) [the consumed current detecting means] to the power supply 23 so as to be supplied with an electric current.

An operating panel lies side-by-side with the seat cushion 4 on the left side or the right side thereof. The operating panel includes a changeover switch 24a for the normal position, a changeover switch 24b for the reclined position, and a changeover switch 24c for the bed position.

When any one of the changeover switch 24a for the normal position, the changeover switch 24b for the reclined position, and the changeover switch 24c for the bed position is operated, each motor is actuated to take a position corresponding to the operated switch.

The electric seat 1 is adapted to be used by changing the positions among the normal position M1, the reclined position M2, and the bed position M3. The positions will now be described. The normal position M1 is a state in which the seatback 5 is in the near upright position, and the leg rest 6 including the footrest 7 stored therein is oriented downward in the near vertical position. The reclined position M2 is a state in which the seatback 5 is inclined rearward (downward), and the leg rest 6 including the footrest 7 stored therein is inclined forward (upward). The bed position M3 is a state in which the seatback 5 is in the near horizontal position, and the leg rest 6 with the footrest 7 pulled out is brought into the near horizontal position on the level with the footrest M. The position is changed in the order of the normal position M1→the reclined position M2→the bed position M3, and in reverse, in the order of the bed position M3→the reclined position M2→the normal position M1.

The controller 20 is connected to the respective switches (the seatback switch 21*a*, the leg rest switch 21*b*, and the footrest switch 21*c*), the respective detectors (the seatback current detector 22*a*, the leg rest current detector 22*b*, and the footrest current detector 22*c*), and the respective changeover switches (the changeover switch 24*a* for the normal position, the changeover switch 24*b* for the reclined position, and the changeover switch 24*c* for the bed position).

The controller 20 comprises a ROM 30 for storing the control program for controlling the position, so that a desired position can be obtained by executing arithmetic control according to the control program. The controller 20 includes a RAM 31 to be used as a working area for arithmetic control. The RAM 31 retains a current that is normally required by the seatback motor 8*a* for operating the seatback 5 in the memory as a reference value (the reference value H1 for the seatback) in advance, and retains a current that is normally required by the leg rest motor 10*a* for operating the leg rest 6 in the memory as a reference value (the reference value H2 for the leg rest) in advance. It is also possible that the RAM 31 retains a current that is normally required by the footrest motor 12*a* for operating the footrest 7 in the memory as a reference value (the reference value for the footrest) [no reference number is designated] in advance as described below in addition to the reference value H1 for the seatback and the reference value H2 for the leg rest.

Figure 3:
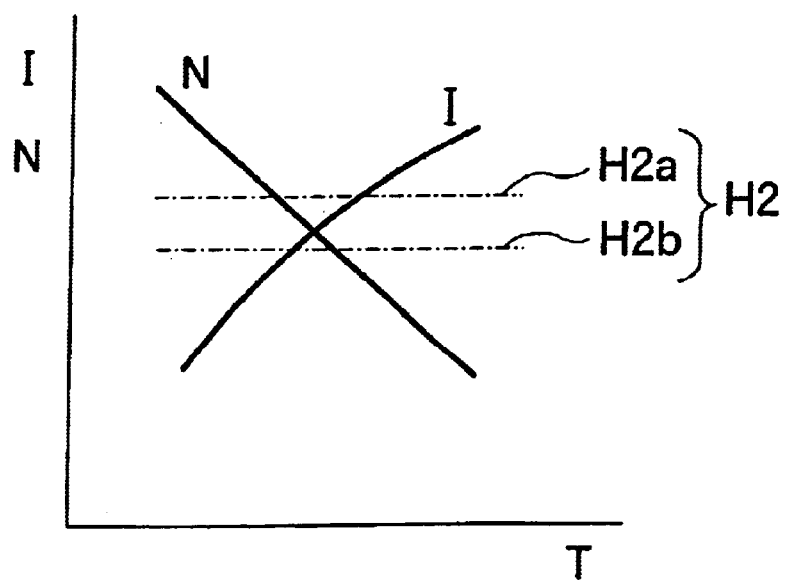
FIG. 3 is a diagrammatic sketch showing the characteristics of torque-current, and the number of revolution of the motor to be used for the electric seat shown in FIG. 1.
Figure 4:
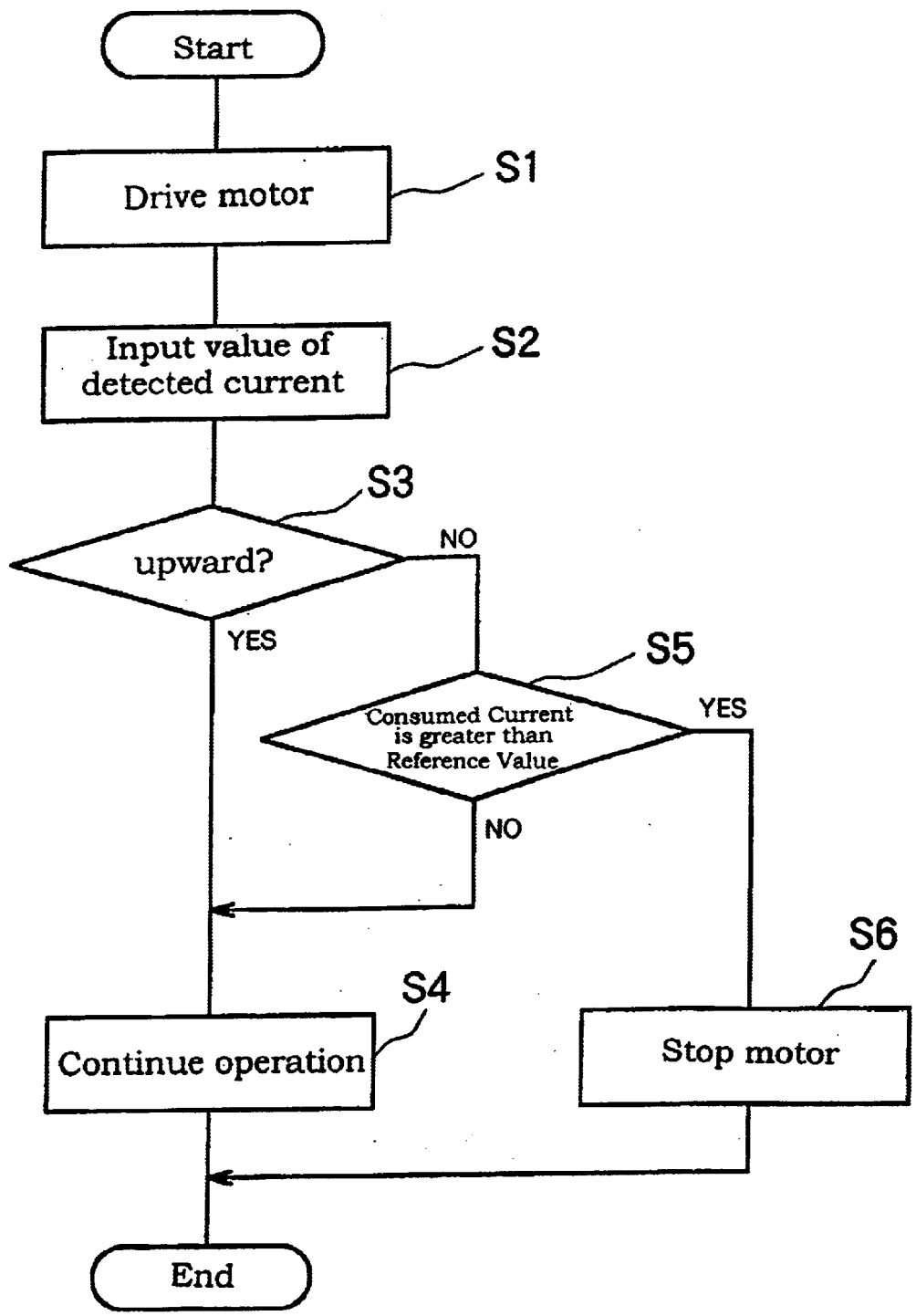
FIG. 4 is a flow chart showing the detection of the operating condition of the seatback, the leg rest, and the footrest by the controller for the electric seat shown in FIG. 1.

As shown in FIG. 3, the respective motors (the seatback motor 8*a*, the leg rest motor 10*a*, and the footrest motor 12*a*) are characterized in that the consumed current I increases with the increase of torque T while the number of rotation N decreases with the increase of torque T.

When the leg rest 6 is pivoted clockwise (upward) in FIG. 1, the leg rest 6 is applied with a large load since legs (femoral portion) are placed thereon. Since the leg rest 6 is lifted in this state, a current required (consumed) by the leg rest motor 10*a* increases. On the other hand, when the leg rest 6 is pivoted counterclockwise (downward) in FIG. 1, a current required (consumed) by the leg rest motor 10*a* decreases in comparison with the case of the upward pivotal movement. Based on the circumstance described above, the reference value H2 for the leg rest includes the reference value H2a for the upward movement of the leg rest and the reference value H2b for the downward movement of the leg rest. In this case, the reference value H2b for the downward movement of the leg rest is determined to the value smaller than the reference value H2a for the upward movement of the leg rest.

In the same manner, the reference value H1 for the seatback includes the reference value H1a for the upward movement of the seatback and the reference value H1b for the downward movement of the seatback [(the reference value H1b for the downward movement of the seatback)< (the reference value H1a for the upward movement of the seatback)].

In the electric seat 1, when the changeover switch 24*b* for the reclined position is operated in the normal position M1, the seatback motor 8*a* and the leg rest motor 10*a* are operated simultaneously or with an appropriate time lag. By the operation of the seatback motor 8*a*, the seatback 5 inclines backward, stops at the predetermined angle, and is supported in this situation. On the other hand, by the operation of the leg rest motor 10*a*, the leg rest 6 inclines upward, stops at the predetermined angle, and is supported in this situation. At this moment, the seat cushion 4 moves forward by a predetermined distance. When the inclining angle of the leg rest 6 in association with the inclining movement of the leg rest 6 reaches a prescribed angle, the footrest motor 12*a* is actuated, and the footrest 7 is pulled out from the leg rest 6 as shown in FIG. 1 in the inclined state, so that the feet (from near the knees to the toes) can be placed on the footrest 7. The operation described above makes the seat in the reclined position M2.

When the changeover switch 24*c* for the bed position is operated in the reclined position M2, the seatback motor 8*a* and the leg rest motor 10*a* are actuated simultaneously or with an appropriate time lag. By the operation of the seatback motor 8*a*, the seatback 5 inclines backward, stops in the near horizontal position (the inclined state in which the distal end of the seatback is slightly higher than the proximal end thereof, and is supported in this state. On the other hand, by the operation of the leg rest motor 10*a*, the leg rest 6 inclines upward, stops in the near horizontal position (the inclined state in which the side of the footrest 7 is slightly lower than the proximal end of the leg rest 6), and is supported in this state. The operation described above makes the seat in the bed position M3.

When the changeover switch 24*b* for the reclined position is operated in the bed position M3, the respective parts are operated in near reverse order to the case where the changeover switch 24*c* for the bed position is operated in the reclined position M2 described above, and the seat takes the reclined position M2.

When the changeover switch 24*a* for the normal position is operated in the reclined state M2, the respective parts are operated in near reverse order to the case where the changeover switch 24*b* for the reclined position is operated in the normal position M1 described above, and the seat takes the normal position M1.

When the changeover switch 24*c* is operated in the normal position M2, the procedures to be taken in a case where the changeover switch 24*b* for the reclined position is operated in the normal position M1, and in a case where the changeover switch 24*c* for the bed position is operated in the reclined position M2 are continuously performed via the reclined position M2, and the seat takes the bed position M3.

When the changeover switch 24*a* for the normal position is operated in the bed position M3 in the same manner as described above, the respective parts are operated in the reverse order to the case where the changeover switch 24*c* for the bed position is operated in the normal position M1, and the seat takes the normal position M1 via the reclined position M2.

Depending on which switch (among the changeover switch 24*a* for the normal position, the changeover switch 24*b* for the reclined position, and the changeover switch 24*c* for the bed position) is operated and also which position the switch is operated, the direction of rotation of the seatback motor 8*a*, and thus the direction of pivotal movement of the seatback 5 (upward movement or downward movement) is determined, and the diction of rotation of the leg rest motor 10a (leg rest 6) and the direction of rotation (the direction of movement) of the footrest motor 12a (footrest 7) are determined in the same manner. The setting is made by the controller 20. In this embodiment, the controller 20 constitutes the operating direction detecting means.

The controller 20 detects the direction of the pivotal movement of the seatback 5, leg rest 6, and the footrest 7, and executes determination of the operating conditions by the use of currents detected by the current detectors 22a, 22b, 22c for the seatback, the leg rest, and the footrest (consumed currents of the seatback 5, the leg rest 6, and the footrest 7) respectively, and based on the result of the determination, switching operation (operation to maintain the closed state or to open) of the switches (the switches 21a, 21b, 21c for the seatback, the leg rest, and the footrest respectively) is made, and allows the leg rest 6 to continue operation or to stop.

When any one of switches (the changeover switch 24a for the normal position, the changeover switch 24b for the reclined position, and the changeover switch 24c for the bed position) is operated, the controller 20 keeps track of the direction of rotation of the respective motors (the seatback motor 8a, the leg rest motor 10a for the, and the footrest motor 12a) and the direction of the movement (direction of rotation or the direction of the forward and backward movement) of the seatback 5, the leg rest 6, and the footrest 7 depending on the positions (the normal position M1, the reclined position M2, and the bed position M3) of the seat at the moment when the switch is operated, which are stored in the RAM 31 prior to the operation of the switch, and on which switch was operated (Step S1). Simultaneously, the switch (the seatback switch 21a, the leg rest switch 21b, and the footrest switch 21c) corresponding to the motors to be operated (the seatback motor 8a, the leg rest motor 10a, and the footrest motor 12a) is closed to supply a current of an appropriate magnitude to the motor to be operated and actuate the seatback 5, the leg rest 6, or the footrest 7.

In Step S2 following Step S1, the controller 20 input the consumed current of the respective motors detected by the current detectors (the seatback current detector 22a, the leg rest current detector 22b, and the footrest current detector 22c).

Subsequently, the determination process of Step S3 and Step S4 are executed successively.

In Step S3, whether or not the seatback 5 and the leg rest 6 pivots upward is determined depending on which switch was operated in which position described above. When it is determined to be Yes (the seatback 5 and the leg rest 6 pivot upward) in Step S3, it goes to Step S4 to continue the operation of the seatback 5 and the leg rest 6.

When it is determined to be No (one of the seatback 5 and the leg rest 6 pivots downward) in Step S3 (here, the case where the leg rest 6 pivots downward is taken as an example), it goes to step S5.

In Step S5, whether or not the consumed current of the leg rest motor 10a supplied in Step S2 is larger than the reference value H2 for the leg rest is determined.

When it is determined to be Yes (the consumed current of the leg rest motor 10a is larger than the reference value H2 for the leg rest) in step S5, it goes to Step S6 to open the switch and stop the operation of the respective motors.

When it is determined to be No (the consumed current of the leg rest motor 10a is smaller than the reference value H2 for the leg rest) in Step S5, it goes to Step S4 to continue the operation of the seatback 5 and the leg rest 6.

In the electric seat 1 constructed as described above, when the baggage B1 is placed or a person (a baby or a infant) entered in the leg rest operating space 40 in the bed position as shown by a chain double-dashed line in FIG. 12, and the changeover switch 24b for the reclined position or the changeover switch 24a for the normal position is operated in this position, the leg rest 6 pivots downward (counterclockwise in FIG. 1). Then, when the leg rest 6 abuts against the baggage B1 or a person (a baby or an infant) before it reaches the reclined position M2, a load applied to the leg rest 6 increases, whereby a current required by the leg rest motor 10a (consumed current) exceeds a current required in the normal state (the reference value H2 for the leg rest).

Therefore, the controller 20 determines to be Yes (the consumed current of the leg rest motor 10a is larger than the reference value H2 for the leg rest) in Step S5, and opens the switch (the seatback switch 21a, the leg rest switch 21b, and the footrest switch 21c) to stop the operation of the respective motors (the seatback motor 8a, the leg rest motor 10a, and the footrest motor 12a) (Step S6) to stop the downward pivotal movement of the leg rest 6. Therefore, the leg rest 6 is prevented from pressing the baggage B1 or a person (a baby or an infant), thereby preventing the baggage from being damaged or the person (a baby or an infant) from being injured.

In the embodiment described above, the case where the leg rest 6 pivots downwardly is taken as an example. In the same manner, the same determination and control can be performed in a case where the seatback 5 pivots downwardly as well. In other words, as shown in FIG. 1 in chain double-dashed line, when the changeover switch 24b for the reclined position or the changeover switch 24c for the bed position is operated with the baggage B2 placed or with a person (a baby or an infant) entered in the seatback operating space 41, the seatback 5 pivots downward. When the seatback 5 abuts against the baggage 32 or the person (a baby or an infant), a load applied on the seatback increases, and thus a current required by the seatback motor 8a (consumed current) exceeds a current required in the normal state.

Therefore, the controller 20 determines to be Yes (a current consumed by the seatback motor 8a is larger than the reference value H1 for the seatback) in Step S5 in the same manner as the case described above (the case of the leg rest 6), opens the switches (the seatback switch 21a, the leg rest switch 21b, and the footrest switch 21c) to stop the operation of the respective motors (the seatback motor 8a, the leg rest motor 10a, and the footrest motor 12a) (Step S6) and stops the downward pivotal movement of the seatback 5. Therefore, the seatback 5 is prevented from pressing the baggage B2 or a person (a baby or an infant), thereby preventing the baggage B2 from being damaged or the person (a baby or an infant) from being injured.

As described above, the RAM 31 may retain the reference value for the footrest in the memory in addition to the reference value H1 for the seatback and the reference value H2 for the leg rest. By using the reference value for the footrest, as in a case where the reference value H1 for the seatback and the reference value H2 for the leg rest are used, the unnecessary motion of the footrest 7 can be stopped. Therefore, even when the baggage B3 is placed or a person (such as a baby) is entered in the footrest operating space 42 as shown in FIG. 1 for example, damage of the baggage B3 or injury of the person (such as a baby) may be prevented as in the case described above.

Though the case where three motors (the seatback motor 8a, the leg rest motor 10a, and the footrest motor 12a) are stopped (Step S6) when it is determined to be Yes (the consumed current of the leg rest motor 10a is larger than the reference value H2 for the leg rest) in Step S5 is taken as an example in the embodiment described above, it is also possible to construct in such a manner that only the corresponding motor (for example, the seatback motor 8a) is stopped because the seatback motor 8a, the leg rest motor 10a, and the footrest motor 12a are operated independently.

In the embodiment described above, it is also possible to provide alarm means (not shown) for alarming that it is determined to be Yes (the consumed current of the leg rest motor 10a is larger than the reference value H2 for the leg rest) in Step S5 by a voice or a lamp, when it is so. In this arrangement, the seated person and the passenger can be quickly notified in case a malfunction occurs.

Though the case where the electric seat 1 is installed in the first-class cabin of the aircraft is taken as an example in the embodiment described above, the present invention is not limited thereto, but it may be applied to the vehicles such as a railway vehicle or a bus, or in the hospital or various facilities as a bed for the aged person or the handicapped person.

According to the present invention, since the determining means determines the operating condition, and determines whether or not an unnecessary reaction force is acting on at least one of the seatback, the leg rest, and the footrest, the operation of the member that is applied with an unnecessary reaction force may be stopped based on the result of the determination.

According to the present invention, since the operation stopping means stops the operation of at least one of the seatback, the leg rest, and the footrest when the determining means shows an unnecessary reaction force, the unnecessary force can be prevented from being applied by at least one of them, thereby preventing damage of the property, injury of the person.

According to the present invention, when the result of the determination of the operating condition made by the determining means shows that an unnecessary reaction force is acting, an alarm is generated by the alarm means. Therefore, the seated person can quickly be notified that an unnecessary force may be applied to other members.

What is claimed is:

1. An electric seat comprising:
    a seatback and a leg rest supported by a seat cushion for pivotal movement;
    a footrest supported for forward and backward movement with respect to the leg rest;
    electric motors provided for the seatback, the leg rest, and the footrest respectively for driving the same;
    operating direction detecting means for detecting an operating direction of at least one of the seatback, the leg rest, and the footrest;
    consumed current detecting means for continuously detecting a current consumed by the respective electric motors through an operation of at least one of the seatback, the leg rest, and the footrest; and
    determining means for continuously comparing the operating direction detected by the operating direction detecting means with a predetermined operating direction, comparing the current of the respective electric motors detected by the consumed current detecting means with predetermined reference values of an upward movement and of a downward movement of at least one of the seatback, the leg rest and the footrest, and executing determination of an operating condition based on compared results by determining whether or not an unnecessary reaction force caused by a baggage or a person unpredictably placed is acting on at least one of the seatback, the leg rest, and the footrest.

2. An electric seat as set forth in claim 1, further comprising operation-stopping means for bringing the operation of at least one of the seatback, the leg rest, and the footrest to a stop in case the determining means determines that an unnecessary reaction force is acting as a result of a determination of the operating condition by the determining means.

3. An electric seat as set forth in claim 1, further comprising alarm means for generating an alarm in case an unnecessary reaction force is acting as a result of a determination of the operating condition by the determining means.

4. An electric seat as set forth in claim 2, further comprising alarm means for generating an alarm in case an unnecessary reaction force is acting as the result of the determination of the operating condition by the determining means.

* * * * *

UNITED STATES PATENT AND TRADEMARK OFFICE
CERTIFICATE OF CORRECTION

PATENT NO.   : 6,783,178 B2
DATED        : August 31, 2004
INVENTOR(S)  : Taro Kasahara It is certified that error appears in the above-identified patent and that said Letters Patent is hereby corrected as shown below:

Title page,
Item [73], Assignee, please replace company name "Mineba Co., Ltd." with
-- Minebea Co., Ltd --.

Signed and Sealed this

Nineteenth Day of April, 2005

JON W. DUDAS
*Director of the United States Patent and Trademark Office*